Feb. 10, 1942.  J. W. McFADYEN  2,272,808
HONEYCOMB UNCAPPING MACHINE
Filed Dec. 18, 1940   3 Sheets-Sheet 1

INVENTOR
JOHN. W. McFADYEN
BY Fetherstonhaugh & Co.
ATTORNEYS

Feb. 10, 1942.   J. W. McFADYEN   2,272,808
HONEYCOMB UNCAPPING MACHINE
Filed Dec. 18, 1940   3 Sheets—Sheet 2
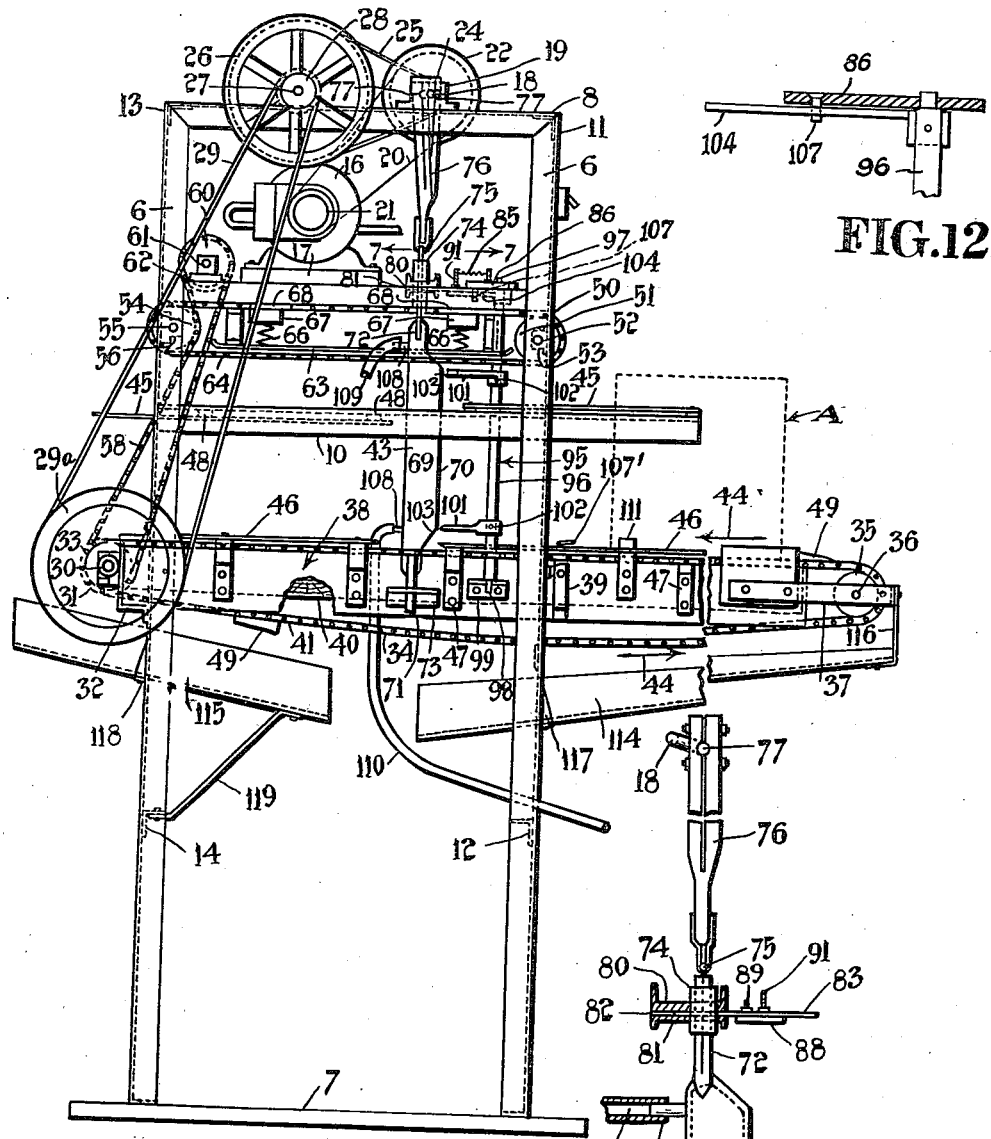
FIG. 12.
FIG. 2
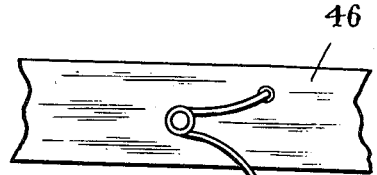
FIG. 10
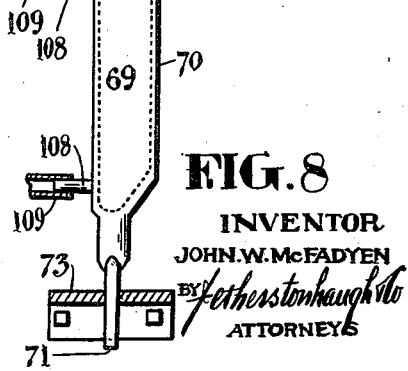
FIG. 8
INVENTOR
JOHN. W. McFADYEN
BY Fetherstonhaugh & Co
ATTORNEYS INVENTOR
JOHN.W.McFADYEN
BY Fetherstonhaugh&Co.
ATTORNEYS Patented Feb. 10, 1942

2,272,808

UNITED STATES PATENT OFFICE 2,272,808

HONEYCOMB UNCAPPING MACHINE

John W. McFadyen, Tiverton, Ontario, Canada, assignor to F. W. Jones & Son, Bedford, Quebec, Canada, a partnership consisting of Harry W. Jones and Mrs. R. L. Craighead Application December 18, 1940, Serial No. 370,698

14 Claims. (Cl. 6—12)

This invention relates to machines for removing wax cappings from honeycomb frames. The primary object is to provide a simple and efficient automatic machine whereby the wax cappings may be removed from a large number of frames in a relatively short period of time and in an entirely satisfactory manner without the use of any manual labor except that required for the routine operation of feeding capped frames to the machine and removing the uncapped frames therefrom.

A feature of the invention resides in the provision of a machine embodying power actuated carrier means by which the honeycomb frames are continuously moved in one direction from the delivery to the discharge end of the machine in combination with power actuated uncapping devices arranged to engage and remove the wax cappings from the frames as the latter travel toward the delivery end of the machine.

Another feature of the invention resides in the provision of a machine in which the said carrier means comprises upper and lower endless carriers adapted to respectively engage the top and bottom portions of the honeycomb frames, suitable guides being located between the upper and lower carriers to ensure that the frames will be maintained in an upright position during their travel through the machine and past the uncapping devices.

Another feature of the invention resides in the provision of an uncapping machine in which the lower flight of the upper carrier is yieldingly pressed against the top of the honeycomb frame travelling therebeneath.

Another feature of the invention resides in the provision of an uncapping machine in which scrapers are arranged in advance of the uncapping devices to remove burr combs from the wax cappings of the frames as they travel toward the uncapping devices.

Another feature of the invention resides in the provision of a machine in which the uncapping devices are adjustably mounted so that the spacing thereof may be varied to suit the width of the honeycomb frames which are passed therebetween during the uncapping operation.

A still further feature of the invention resides in the provision of a machine in which the spacing of the uncapping devices to suit the width of the honeycomb frames passing therebetween is automatically controlled by a feeler mechanism arranged to be engaged and actuated by the honeycomb frames as they approach the uncapping devices.

A still further feature of the invention resides in the provision of a machine in which the uncapping devices are in the form of vertically extending reciprocating knives located at opposite sides of the carrier means.

A still further feature of the invention resides in the provision of a machine in which the said vertical reciprocating knives are also mounted for turning movement so that the spacing of the cutting edges of the knives may be adjusted to suit the width of the honeycomb frames which are passed therebetween during the uncapping operation.

The foregoing and other features of the invention, as well as the details of construction and operation of the specific embodiment selected for illustration, will be more readily understood from the following detailed description taken in connection with the accompanying drawings, in which—

Fig. 2 is a view similar to Fig. 1, but showing the opposite side of the machine.

Fig. 8 is a sectional view taken substantially along the line 8—8 of Fig. 7.

Fig. 10 is a detail view showing a spring pawl carried by one of the lower guides associated with the lower carrier.

Fig. 12 is a detailed view partly in elevation and partly in section showing one of the stops provided in connection with the feeler mechanism.

Figure 1:
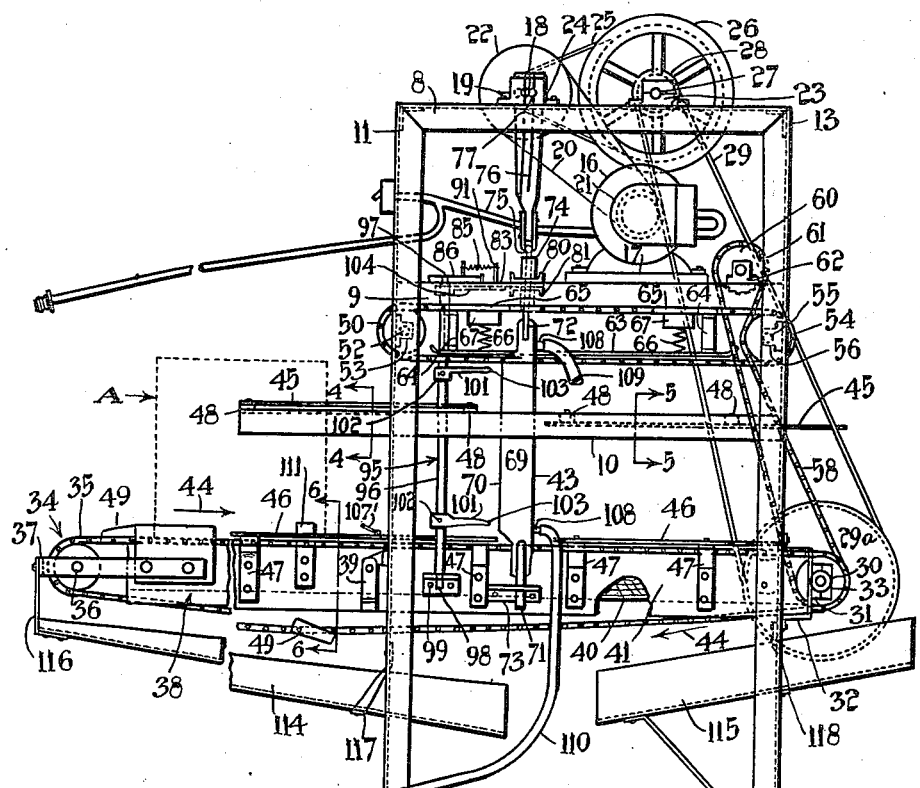
Fig. 1 is a side elevation of my improved machine.
Figure 6:
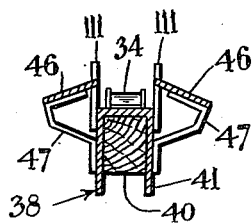
Fig. 6 is a sectional view taken substantially along the line 6—6 of Fig. 1.
Figures 4, 5, 11:
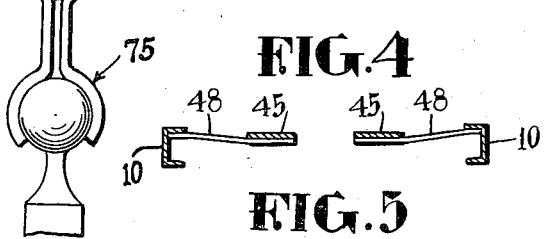
Fig. 4 is a sectional view taken substantially along the line 4—4 of Fig. 1.
Fig. 5 is a sectional view taken substantially along the line 5—5 of Fig. 1.
Fig. 11 is an enlarged detailed view of one of the ball and socket connections provided between the uncapping knives and the knife operating mechanism.
Figure 3:
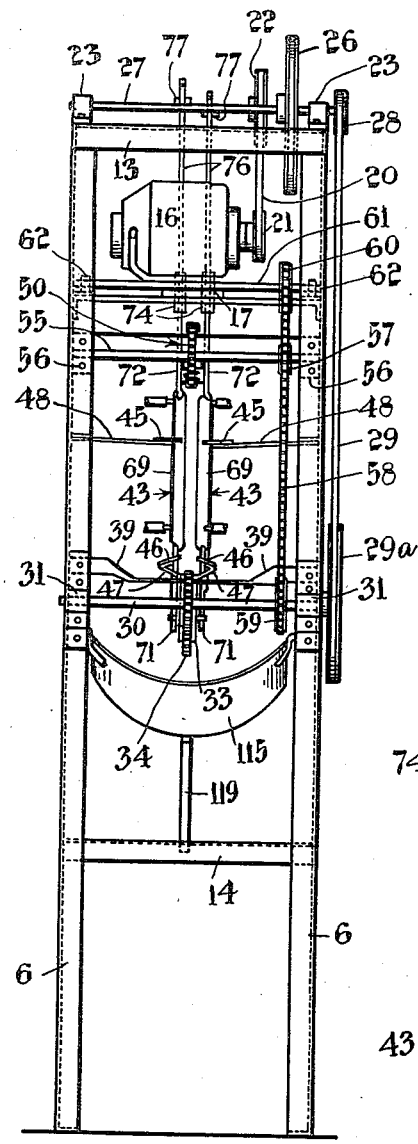
Fig. 3 is a rear end elevation.

As shown in these drawings, the main frame structure of my improved machine comprises four vertical corner posts 6 rising from a suitable base 7, said posts being tied together by horizontal side members 8, 9 and 10 and horizontal front and rear end members 11, 12, 13 and 14.

A driving motor 16 is mounted on a platform 17 carried by the side frame members 9. This motor drives a crank shaft 18 mounted in bearings 19 carried by the side frame members 8, the driving connection comprising a driving belt 20 trained around a relatively small driving pulley 21 fixed to the armature shaft of motor 16 and a relatively large driven pulley 22 fixed to shaft 18.

A relatively small pulley 24, fixed to shaft 18, is connected by belt 25 with a relatively large pulley 26 fixed to a shaft 27 journalled in bearings 23 carried by the frame members 8. Shaft 27 also carries a relatively small pulley 28 which is connected, by belt 29, with a relatively large pulley 29a fixed to a shaft 30 journalled in bearings 31 carried by brackets 32 projecting outwardly from the rear corner posts 6.

Shaft 30 carries the driving sprocket 33 of an endless conveyor chain 34 which is also trained around a sprocket 35 on a shaft 36 journalled in a projecting bearing bracket 37 carried by the forward end of a horizontal beam member 38 which lies between the upper and lower flights of the conveyor chain 34 and is supported in place by suitable supporting brackets 39 attached to the corner posts 6. The beam 38 is here shown as comprising an inner wooden portion 40 and an outer metal portion 41, the latter covering the top, sides and front end of the wooden portion.

The conveyor chain 34 serves as an endless supporting carrier by which the honeycombs, one of which is indicated at A, are moved past the uncapping knives 43 when the carrier is travelling in the direction indicated by the arrows 44. As they travel from the front to the rear end of the conveyor chain or carrier the honeycombs pass between upper guide plates 45 and lower guide plates 46, the latter being carried by brackets 47 fastened to the side portions of the beam 38. The upper guide plates 45 are carried by brackets 48 projecting inwardly from the side frame members 10. The conveyor chain 34 is provided with pivoted lugs 49 which act against the honeycombs to push them along the conveyor.

As each honeycomb approaches the knives 43 the top portion thereof is engaged by the lower flight of an upper endless conveyor chain or carrier 50 which is positioned between and above the upper guide plates 45. The front sprocket 51 of conveyor chain 50 is fixed to a shaft 52 journalled in bearings 53 carried by the front corner posts 6. The rear sprocket 54 of conveyor chain 50 is fixed to a shaft 55 journalled in bearings 56 carried by the rear corner posts 6. A driving sprocket 57 on shaft 55 is engaged and driven by a drive chain 58 which is trained around the chain driving sprockets 59 and 60, the sprocket 59 being carried by the driving shaft 30 of the lower conveyor chain 34 and the sprocket 60 being fixed to an idler shaft 61 journalled in brackets 62 carried by the frame members 9.

The lower flight of conveyor chain 50 is yieldingly pressed against the top of the honeycomb by means of a pressure plate 63 which is yieldingly supported by flexible brackets 64 extending inwardly from wooden blocks 65 fastened to one of the frame members 9. Coil springs 66 are confined between the top of the pressure plate 63 and suitable cross members 67. As here shown each cross member 67 has one end fastened to one of the wooden blocks 65 and the other end fastened to a similar block 68 carried by the opposite frame member 9.

Each knife 43 comprises a hollow intermediate portion 69 provided with an integral cutting edge 70, a lower cylindrical guide extension 71 and an upper square guide extension 72. The lower extension 71 of each knife is slidably and rotatably mounted in a bearing bracket 73 fastened to one side of the beam member 38. The guide extension 72 of each knife extends upwardly through a square bore provided in a bushing 74 and is connected by a conventional ball and socket joint 75 to the lower end of a connecting rod 76 which is fastened to one of the cranks 77 of the crank shaft 18.

The bushing 74 of each knife is rotatable in bearing openings 78 and 79 provided in the upper and lower bearing plates 80 and 81. The lower bearing plate 81 extends between the side frame members 9 and is fastened thereto. The upper bearing plate 80 is bolted to the bearing plate 81 but is separated from the latter by suitable spacers 82. Each bushing 74 is provided with a laterally projecting lever arm 83 which works between the bearing plates 80 and 81 and holds the bushing against vertical displacement.

The two lever arms 83 project forwardly beyond the bearing plates 80 and 81 and are connected to the inner ends of a pair of crossed springs 85, the outer ends of which are anchored to the fastening bolts 86a of a plate 86 which is fastened to the frame members 9.

For a purpose hereinafter explained, an adjustable connection is preferably provided between each lever arm 83 and the inner end of the associated spring 85. This adjustable connection comprises a block 88 which is pivotally secured to the underside of the lever arm 83 by a pivot bolt 89 passing through one end of the block. Adjacent its opposite end the block is provided with an upwardly projecting bolt 91 to which the inner end of the spring 85 is anchored, said bolt extending upwardly through an arcuate slot 92 in the lever arm 83 and being provided with a clamping nut 93 engageable with the upper surface of the lever arm.

A pair of vertically extending feeler shafts 95 are arranged at opposite sides of the carriers 34 and 50 in advance of the knives 43. Each feeler shaft comprises a square body portion 96 provided with upper and lower cylindrical extensions 97 and 98. The extensions 97 are rotatably mounted in bearing openings provided in the plate 86 while the cylindrical extensions 98 are rotatably mounted in bearing brackets 99 carried at opposite sides of the beam 38. Each feeler shaft is equipped with vertically spaced feeler fingers 101, each finger having one end bolted to the shaft as indicated at 102 and the other end provided with an inwardly directed extension 103 adapted to engage one side of the honeycomb frame as the latter approaches the cutting knives. Each feeler shaft is also provided, adjacent its upper end, with a laterally extending arm 104 having one end bolted to said shaft as indicated at 105 and having the other end extending into engagement with the block 88 carried by the lever arm 83 of one of the knife mounting bushings 74. Stops 107 project downwardly from the plate 86 and are arranged to limit the extent to which the arms 104 of the feeler shafts 95 may be swung toward each other.

Figure 7:
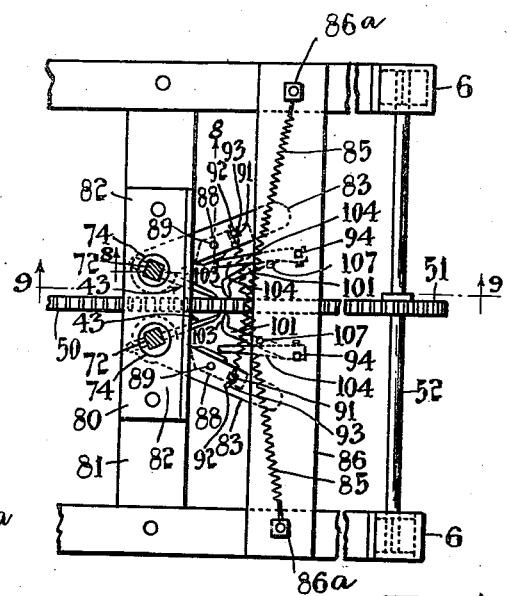
Fig. 7 is a sectional view taken substantially along the line 7—7 of Fig. 2.
Figure 9:
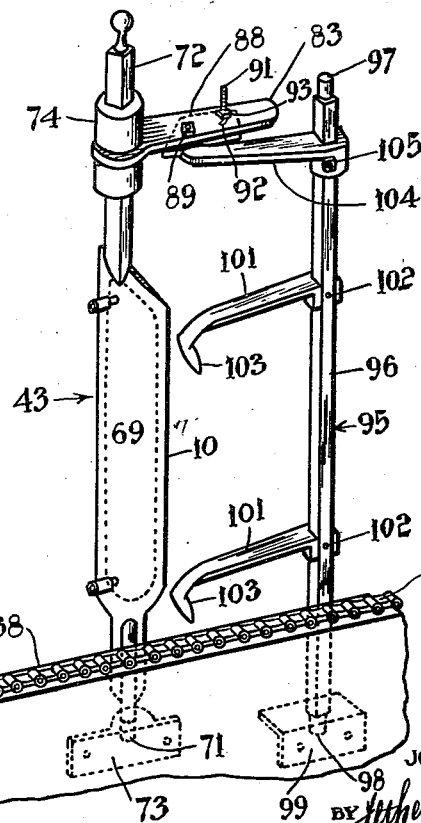
Fig. 9 is a sectional view taken substantially along the line 9—9 of Fig. 7.

From the foregoing description it will be apparent that the springs 85 act through the lever arms 83 and the bushings 74 to swing the knives 43 toward each other so that the cutting edges 70 of the knives are initially positioned relatively close together as shown in Figure 7. In this position of the knives the arms 104 at the upper ends of the feeler shafts 95 are swung inwardly to the position shown in Figure 7 by reason of the fact that these arms are engaged and forced inwardly by the blocks 88 attached to the lever arms 83. This of course results in the two sets of feeler fingers carried by the feeler shafts being initially positioned relatively close together as shown in Figure 7. As each honeycomb frame approaches the cutting edges of the knives 43 it passes between and separates the two sets of feeler fingers 101 located at opposite sides of the path of travel of the frame. This separating movement of the feeler fingers results in the turning of the feeler shafts so that the arms 104 at the upper ends of said shafts act against the blocks 88 to swing the cutting edges of the knives outwardly against the resistance of the springs 85. The distance which the cutting edge of the knives is thus spread apart as well as the cutting angle of the knives is thus automatically adjusted to suit the width of the honeycomb frames and to ensure that the wax cappings will be properly removed therefrom.

The tension of the springs 85 and the initial setting of the knives 43 may be adjusted to give the best results for any particular width of honeycomb frame by loosening the clamping nuts 93 and adjusting the blocks 88 about the pivotal axes provided by the fastening bolts 89, the blocks being then clamped in their adjusted position by tightening the clamping nuts 93.

The complete operation of the machine described herein may be reviewed as follows:

When the motor 16 is started up it drives the shafts 18, 27 and 30 through the agency of the belt and pulley drive connections provided for this purpose. As shaft 30 is driven it causes the lower endless carrier 34 to travel in the direction indicated by the arrows. Similar travelling movement is imparted to the upper carrier 50 by means of the sprocket 57 and drive chain 58. At the same time rapid vertical reciprocation is imparted to the knives 43 through the agency of the crank shaft 18 and the connecting rods 76. After the machine has been thus put into operation a honeycomb frame A is arranged on the upper flight of the lower carrier 34 immediately in advance of one of the lugs 49 so that the frame is thus caused to travel in the direction of the cutting knives 43 and is maintained in upright position by the upper and lower guide plates 45 and 46. As the leading end of the frame passes between the feeler shafts 95 it engages and separates the two sets of feeler fingers 101. As the feeler shafts are rotated by this separation of the feeler fingers the arms 104 at the upper ends of said shafts act against the blocks 88 to move the lever arms 83 outwardly against the resistance of the springs 85, this movement of lever arms 83 serving to turn the bushings 74 in a knife separating direction so that the cutting edges 70 of the knives are spread apart a suitable distance depending upon the width of the honeycomb frame.

It will also be noted that, as the honeycomb frame approaches the cutting edges of the knives 43 the top portion of the frame passes beneath and is engaged by the lower flight of the upper carrier 50. As previously stated the spring pressed pressure plate 63 causes the lower flight of the upper carrier to exert a yielding downward pressure on the honeycomb frame which assures that the latter will be held in proper position on the lower carrier during the engaging operation.

A spring pawl 107' is carried by one of the lower guide plates 46 and projects inwardly over the lower carrier 34. This pawl is yieldable to permit passage of the honeycomb frames in the direction of the cutting knives but prevents any reverse movement of the frames after they have passed beyond the pawl.

The knives 43 are preferably heated by passing steam or other heating fluid through the hollow portion 69. This may be accomplished by providing the hollow portion of the knife with nipple extensions 108 to which are connected the steam supply and exhaust tubes 109 and 110. Scrapers 111 are fastened to the beam 38 at opposite sides of the conveyor 34 and in advance of the feeler shafts 95. These scrapers serve to remove burr combs from the wax cappings of the frames as they travel toward the uncapping machine.

Front and rear refuse trays 114 and 115 are arranged beneath the lower carrier 34 to catch portions of the wax cappings or other refuse which drop from the honeycomb frames as they pass to and beyond the cutting knives 43. The front portion of the tray 114 is fastened, by a hanger 116, to the shaft supporting bracket 37 provided at the front end of the beam 38. The rear portion of tray 114 is supported from the front corner posts 6 by suitable bracket means 117. The rear tray 115 is supported from the rear posts 6 by suitable supporting brackets 118 and 119. The trays 114 and 115 are inclined so that the refuse dropping thereon is guided toward the central portion of the main frame.

Having thus described what I now conceive to be the preferred embodiment of my invention, it will be understood that various modifications may be resorted to within the scope and spirit of the appended claims.

Having thus described my invention, what I claim is:

1. A honeycomb uncapping machine comprising a lower endless supporting carrier on which the honeycomb frames are arranged in upright position with the wax cappings to be removed lying in planes substantially parallel with the sides of the carrier, an upper endless carrier arranged to engage the top of the frames mounted on the lower carrier and to cooperate with the latter in moving the frames along a predetermined path of travel, uncapping means arranged at a point intermediate the length of the path of travel of said frames and adapted to engage and remove the wax cappings from the frames as the latter are carried past the uncapping means by the travelling motion of the carriers, and means for actuating said carriers so that the frame engaging portions thereof are continuously moving in the same direction.

2. A honeycomb uncapping machine as set forth in claim 1 in which the uncapping means comprises vertically extending knives between which the frames are carried by said carriers.

3. A honeycomb uncapping machine as set forth in claim 1 in which the uncapping means comprises vertically extending knives mounted at opposite sides of said carriers and means for reciprocating said knives in a vertical direction.

4. A honeycomb uncapping machine as set forth in claim 1 including means for yieldingly pressing the frame engaging portion of the upper carrier against the top portions of the honeycomb frames engaged by said carrier.

5. A honeycomb uncapping machine as set forth in claim 1 in which the upper carrier is arranged so that its lower flight engages the top portions of the honeycomb frames supported on the lower carrier, and means for exerting yielding downward pressure on the lower flight of said carrier.

6. A honeycomb uncapping machine as set forth in claim 1 in which the upper carrier is arranged so that its lower flight engages the top portions of the honeycomb frames supported on the lower carrier, and means for yieldingly pressing the lower flight of said carrier against the top portions of said frames comprising a pressure plate overlying and engaging the said lower flight of the upper carrier, and springs arranged to exert downward pressure on said plate.

7. A honeycomb uncapping machine as set forth in claim 1 including lower guide plates positioned at opposite sides of and above the lower carrier, and upper guide plates positioned at opposite sides of and below the upper carrier.

8. A honeycomb uncapping machine as set forth in claim 1 including scrapers projecting upwardly at opposite sides of the lower carrier, said scrapers being located in advance of said uncapping means and being adapted to scrape off any small combs which are attached to the wax cappings of the honeycomb frame.

9. A honeycomb uncapping machine as set forth in claim 1 in which the uncapping means comprises vertically extending knives, bearings in which said knives are slidably and rotatably mounted, said bearings being mounted at opposite sides of said carriers, means for imparting an up and down sliding or reciprocating movement to said knives, and means for rotating said knives relatively to said bearings to adjust the cutting angle of the knives.

10. A honeycomb uncapping machine comprising a pair of laterally spaced vertically extending knives, each of said knives being mounted for sliding movement in a vertical direction and for swinging movement about a vertical axis, each of said knives being also provided with a cutting edge disposed parallel to but at one side of said axis, means for reciprocating said knives in a vertical direction, means for passing honeycomb frames between said knives so that the wax cappings on the sides of the frames will be engaged and removed by the cutting edges of the knives, means arranged to be actuated by each honeycomb frame as it approaches the knives for turning the knives about said axes to insure proper spacing of the cutting edges of the knives with reference to the width of the frame.

11. A honeycomb uncapping machine comprising carrier means for supporting and moving a honeycomb frame along a predetermined path of travel, adjustable uncapping devices arranged at opposite sides of said carrier means adapted to engage and remove the wax cappings from the honeycomb frame as the latter are carried past the uncapping means by the carriers, and means actuated by the honeycomb frames as they approach the uncapping means for automatically adjusting the spacing of the uncapping means to suit the width of the frames.

12. A honeycomb uncapping machine comprising a pair of laterally spaced vertically extending knives between which the honeycomb frames are passed so that the wax cappings at opposite sides of the frames are engaged and removed by the cutting edges of the knives, each of said knives being provided with a lower circular extension and an upper non-circular extension, said extensions being axially aligned and being positioned to one side of the cutting edge of the knife, bearings in which the lower circular extensions of the knives are slidably and rotatably mounted, vertically extending rotatably mounted bushings provided with non-circular bores in which the non-circular extensions of the knives are fitted so that said non-circular extensions are slidable through said bushings but are held against turning movement relative thereto, means for imparting vertical reciprocating movement to said knives, and means for turning said bushings to swing the cutting edges of the knives toward or away from each other.

13. A honeycomb uncapping machine as set forth in claim 12 in which the last mentioned means is actuated by the honeycomb frames as they are moved toward the cutting edges of the knives.

14. A honeycomb uncapping machine comprising a pair of vertically extending knives, carrier means for passing honeycomb frames between said knives so that the wax cappings at opposite sides of the frames are sliced off by the cutting edges of the knives, adjustable means for moving said knives relatively to each other to vary the spacing of the cutting edges of the knives, movable oppositely located feelers normally arranged so that they are engaged and separated by the honeycomb frames as the latter approach the cutting edges of the knives, and means actuated by said feelers to operate the knife adjusting means to suitably position the cutting edges of the knives with reference to the width of the frames as determined by the separating movement of the feelers.

JOHN W. McFADYEN.